Jan. 28, 1958 G. M. GREGORY 2,821,420
PACKING RING
Filed April 29, 1954

GLENN M. GREGORY
INVENTOR.

BY Herbert J. Brown

ATTORNEY

United States Patent Office 2,821,420
Patented Jan. 28, 1958

2,821,420

PACKING RING

Glenn M. Gregory, Fort Worth, Tex.

Application April 29, 1954, Serial No. 426,387

1 Claim. (Cl. 288—13)

This invention relates to packing rings, and has reference to heavy duty packing rings such as used in slush pumps and for other heavy industrial work.

An object of the invention is to provide a packing ring construction and arrangement which is easy to install, yet one which is effective for its intended purpose.

Another object of the invention is to provide a packing ring of relatively few parts for economical manufacture.

A particular object of the invention is to eliminate garter springs used in conventional segment type packing rings, and which garter springs were objectionable because they accumulated abrasive material, were subject to breakage and scoring the piston rod, and were difficult to place around the segments referred to.

Another object of the invention is to provide a packing ring construction wherein the springs therein are flush with the packing ring sections and thereby effect a seal, together with the surface of the assembled ring, when in contact with an inner surface of the packing box.

A further object of the invention is to provide a leaf spring construction in a packing ring, and which spring is located and arranged to help prevent corrosive chemicals from entering the packing box.

Another object of the invention is to provide a string construction and arrangement in a packing ring whereby said spring, acting upon two sections, provides both inward and outward pressure.

These and other objects of the invention will become apparent from the following description and the accompanying drawing, wherein.

Figure 4:
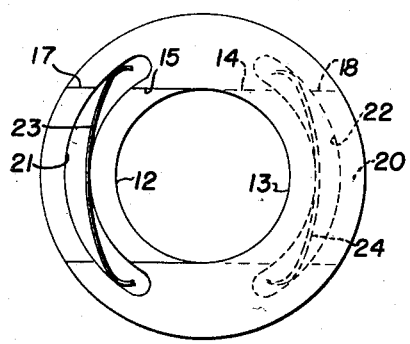
Figure 4 is a plan view of the assembled ring.

The exemplary form of the invention shown is comprised of a pair of flat circular sections 10 and 11, each of which is substantially in the form of a U. The inner ends of the openings of the sections 10 and 11 are semicircular, as at 12 and 13, and define a circle when the sections are assembled. The remaining sides of the last referred to openings are parallel, as at 14 and 15, and the parallel openings 14 and 15 of the respective segments slidably engage the straight parallel sides 17 and 18 of oppositely arranged shoulders 19 and 20, each integral and projecting from an opposing face of each said segment. When assembled, the projection 19 of one section 10 slidably engages the parallel sides 15 of the other section 11; at the same time, the remaining projection 20 slidably engages the parallel sides 14 of the opening in the first referred to section 10.

Figure 5:
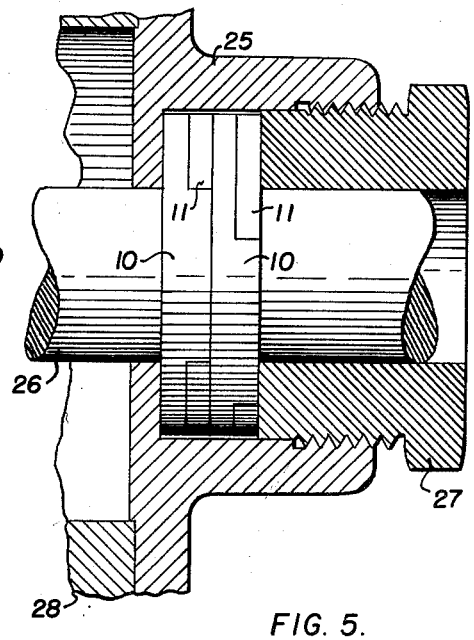
Figure 5 is a vertical sectional view of a packing box and showing an arrangement of the present packing rings positioned therein.
Figure 3:
Figure 3 is an end elevation of the section shown in Figure 2.
Figure 1:
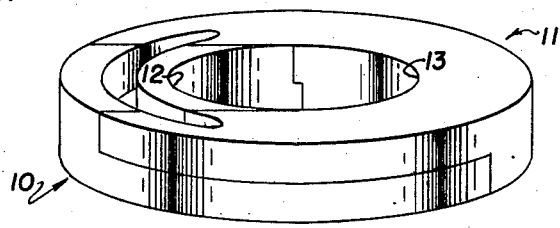
Figure 1 is a perspective view, with the springs removed, of a packing ring embodying the features of the invention.
Figure 2:
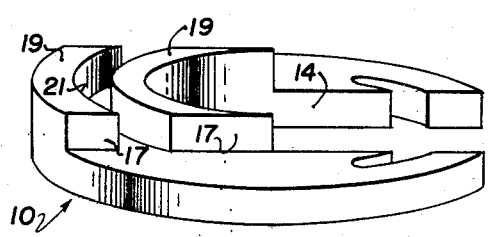
Figure 2 is a perspective view of one of the ring sections apart from the rest of the assembly.

Arcuate grooves 21 and 22 are formed in opposite sides of the assembled packing ring, and which grooves are formed in the outer surface of the shoulders 19 and 20 and extend into the projecting sides of the sections 10 and 11. The depth of the grooves 21 and 22 are equal to the shoulder thicknesses, thus providing a continuous surface with the adjacent surface of each said segment. A leaf spring 23 and 24 is provided in each groove 21 and 22, the outer ends of which springs bear against the outer surfaces of said grooves where they terminate in the extending portions of the sections, and whereby the intermediate portion of each spring bears against the inner surface of its respective groove within the associated shoulder 19 or 20. Thus, a self-contained metal packing ring is provided by reason of the springs bearing inwardly intermediate their ends and outwardly at the ends thereof. The width of each spring 23 and 24 is equal to the depth of the groove 21 or 22 in which it is positioned, thus providing additional sealing surface between two or more of the described assemblies, or against a flat surface within a packing ring box 25 as shown in Figure 5. It is to be understood that the packing ring box assembly shown is exemplary, and that packing rings such as illustrated and described are adapted for use in other types of box arrangements where a reciprocating piston rod, such as 26, is positioned therethrough. The example shown includes a threaded retainer 27 and a cylinder 28 arranged in the usual manner.

While a preferred embodiment of the invention has been shown and described, it is to be understood that the construction may be varied by those versed in the art and yet come within the scope of the appended claim.

What is claimed is:

A packing ring comprising a pair of flat circular U-shaped sections wherein the inner ends of their respective openings are semicircular and wherein the opposing sides of said openings are parallel with each other, a shoulder projecting from one surface of each said U-shaped section at the closed end thereof, the shoulder of each of said U-shaped sections fitting slidably within the open end of the other of said U-shaped sections in complementary relationship thereto to define a two-piece segmental ring, each of said shoulders being provided with a transverse groove which extends into the adjacent portions of the complementary U-shaped section on each side of the shoulder, and a leaf spring received within each groove.

References Cited in the file of this patent

UNITED STATES PATENTS

| | | |
|---|---|---|
| 1,083,151 | Steinbrueck | Dec. 30, 1913 |
| 1,106,054 | Owens | Aug. 4, 1914 |
| 1,181,084 | Paxton | Apr. 25, 1916 |
| 2,055,153 | Madsen | Sept. 22, 1936 |
| 2,589,274 | Moratta | Mar. 18, 1952 |
| 2,594,697 | Tatham | Apr. 29, 1952 |